United States Patent

Bühler

Patent Number: 5,495,004
Date of Patent: Feb. 27, 1996

[54] MONOAZO DISPERSED DYE AND MIXTURES CONTAINING THEM AND THE PREPARATION AND USE THEREOF

[75] Inventor: Ulrich Bühler, Alzenau, Germany

[73] Assignee: Hoechst Mitsubishi Kasei Company, Germany

[21] Appl. No.: 5,270

[22] Filed: Jan. 19, 1993

[30] Foreign Application Priority Data

Feb. 1, 1992 [DE] Germany .............. 42 02 870.1

[51] Int. Cl.⁶ .............. C09B 29/085; C09B 67/22; D06P 1/18; D06P 3/54

[52] U.S. Cl. .............. 534/854; 534/855; 8/639; 8/922

[58] Field of Search .............. 534/854, 855; 8/639, 922

[56] References Cited

U.S. PATENT DOCUMENTS

| | | | |
|---|---|---|---|
| 3,955,919 | 5/1976 | Fujii et al. | 8/639 |
| 4,099,909 | 7/1978 | Koller et al. | 8/922 X |
| 4,448,719 | 5/1984 | Schwander | 534/854 X |

FOREIGN PATENT DOCUMENTS

| | | |
|---|---|---|
| 0043795 | 1/1982 | European Pat. Off. . |
| 2916137 | 10/1980 | Germany . |

*Primary Examiner*—Johann Richter
*Assistant Examiner*—Fiona T. Powers
*Attorney, Agent, or Firm*—Connolly & Hutz

[57] ABSTRACT

The present invention relates to monoazo dyes of the general formula I

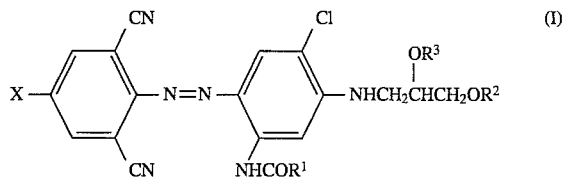

in which

X is methyl, chlorine or bromine, $R^1$ is ethyl, n-propyl, i-propyl, n-butyl or i-butyl, $R^2$ is $(C_1-C_6)$-alkyl, $(C_1-C_4)$-alkoxy-substituted linear $(C_2-C_4)$-alkyl, allyl, phenyl, acetyl or propionyl and $R^3$ is hydrogen, acetyl or propionyl, mixtures containing dyes of the general formula I and the preparation of these dyes and their mixtures and their use for the dyeing of hydrophobic synthetic materials, in particular for automotive cover fabrics.

18 Claims, No Drawings

MONOAZO DISPERSED DYE AND MIXTURES CONTAINING THEM AND THE PREPARATION AND USE THEREOF

The present invention relates to monoazo dyes, mixtures containing monoazo dyes, processes for their preparation and their use for the dyeing of hydrophobic synthetic materials.

Dyes which are similar to the dyes according to the invention have already been disclosed in EP-A 43,795. However, they have disadvantages in practical application, in particular with respect to the build-up and exhaust properties. As a result, it is, for example, not possible to achieve high colour depths and the waste water is relatively heavily polluted. Moreover, their relatively large temperature sensitivity easily results in variations of the colour depth upon variation of the dyeing temperature.

The object of the present invention is to provide dyes having improved properties with respect to the dyes from EP-A 43,795.

The present invention relates to monoazo dyes of the general formula I

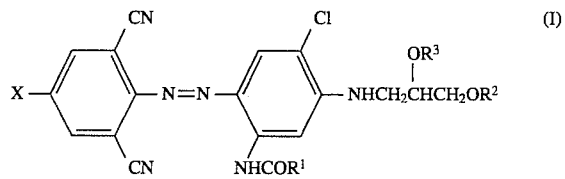

in which

X is methyl, chlorine or bromine, $R^1$ is ethyl, n-propyl, i-propyl, n-butyl or i-butyl, $R^2$ is $(C_1-C_6)$-alkyl, $(C_1-C_4)$-alkoxy-substituted linear $(C_2-C_4)$-alkyl, allyl, phenyl, acetyl or propionyl and $R^3$ is hydrogen, acetyl or propionyl.

$(C_1-C_6)$-Alkyl as $R^2$ can be linear or branched and is for example, methyl, ethyl, n-propyl, i-propyl, n-butyl, sec-butyl, i-butyl, n-pentyl, 3-methylbutyl, n-hexyl or 2-ethylbutyl.

Examples of $(C_1-C_4)$-alkoxy-substituted linear $(C_2-C_4)$-alkyl are 2-methoxyethyl, 2-ethoxyethyl, 2-n-propoxyethyl, 2-i-propoxyethyl, 2-n-butoxyethyl, 2-i-butoxyethyl, 4-methoxybutyl or 4ethoxybutyl.

In the general formula I, X is preferably bromine and in particular chlorine. $R^1$ is preferably ethyl, n-propyl or i-propyl. $R^2$ is preferably ( $C_1-C_4$)-alkyl, 2-methoxyethyl, 2-ethoxyethyl or allyl. $R^3$ is preferably hydrogen. Preferred dyes of the general formula I are those in which X and $R^1$ to $R^3$ are preferred substituents.

The present invention also relates to mixtures of at least two monoazo dyes of the general formula I

in which

X is methyl, chlorine or bromine, $R^1$ is methyl, ethyl, n-propyl, i-propyl, n-butyl or i-butyl, $R^2$ is $(C_1-C_6)$-alkyl, $(C_1-C_4)$-alkoxy-substituted linear $(C_2-C_4)$alkyl, allyl, phenyl, acetyl or propionyl and $R^3$ is hydrogen, acetyl or propionyl.

Preferred mixtures according to the invention contain monoazo dyes of the general formula I in which X, $R^1$, $R^2$ and $R^3$ are preferred radicals or in which $R^1$ is methyl and X, $R^2$ and $R^3$ are preferred radicals.

In particularly preferred mixtures according to the invention, the monoazo dyes of the general formula I only differ in the meaning of the radicals $R^1$.

In the dye mixtures according to the invention, the ratio of the various dyes of the general formula I can vary within relatively wide limits, and the dyes can be present as mixtures of crystals or entirely or in part in the form of mixed crystals. In general, the minimum weight percentage of one component is 10% and its maximum weight percentage is 90%. In the case of dye mixtures comprising only two dyes of the general formula I, a weight ratio of 70:30 to 30:70 is preferred, i.e. the weight percentage of a dye is 30 to 70%.

In a particular embodiment of the present invention, the dyes of the general formula I or their mixtures are shaded with C.I. Solvent Orange 63 or dyes similar to that.

A further particular embodiment of the present invention relates to mixtures of one or more of the dyes of the general formula I with one or more dyes, such as usually used for the dyeing of polyester fibres or polyester textile materials for automotive cover fabrics. The dyes for the dyeing of automotive cover fabrics are in particular azo, disazo, anthraquinone, nitro, naphthalimide and terephthalimide dyes. Particularly preferred dyes of this type are the Colour Index dyes Yellow 23, Yellow 42, Yellow 51, Yellow 59, Yellow 71, Yellow 86, Yellow 108, Yellow 122, Yellow 163, Yellow 182, Orange 29, Orange 30, Orange 32, Orange 41, Orange 45, Orange 61, Orange 73, Red 60, Red 86, Red 91, Red 92, Red 127, Red 134, Red 138, Red 159, Red 167, Red 191, Red 202, Red 258, Red 279, Red 284, Red 302, Red 323, Blue 27, Blue 54, Blue 56, Blue 60, Blue 77, Blue 79:1, Blue 87, Blue 266, Blue 333, Violet 27, Violet 28, Violet 57 and Violet 95.

The weight ratios of the dyes of the general formula I or their mixtures and the dyes mentioned are entirely uncritical and depend on the shade desired.

The dyes according to the invention of the general formula I are preferably prepared by subjecting a compound of the general formula II

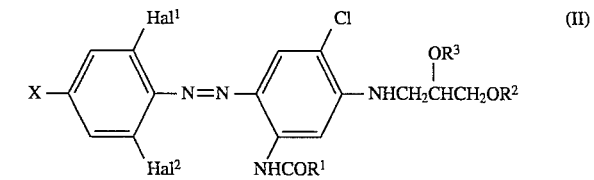

in which $Hal^1$ and $Hal^2$, independently of one another, are chlorine or preferably bromine and $R^1$, $R^2$, $R^3$ and X are as defined above, to a nucleophilic exchange reaction, the nucleophile used being the cyanide ion $CN^\ominus$. This reaction, in which Hal, which is chlorine or bromine, is exchanged for CN, is preferably carried out by the procedure described in German Offenlegungsschrift 1,809,920, German Offenlegungsschrift 1,809,921, British Patent Specification 1,184, 825, German Auslegeschrift 1,544,563, German Offenlegungsschrift 2,310,745, German Auslegeschrift 2,456,495, German Auslegeschrift 2,610,675, German Offenlegungsschrift 2,724,116, German Offenlegungsschrift 2,724,117, German Offenlegungsschrift 2,834,137, German Offenlegungsschrift 2,341,109, U.S. Pat. No. 3,821,295, German Offenlegungsschrift 2,715,034 or German Offenlegungsschrift 2,134,896.

The compounds of the general formula II are prepared by processes known to one skilled in the art, preferably by diazotising an amine of the general formula III

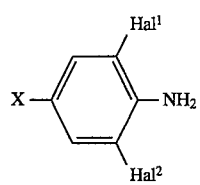

(III)

in which X and Hal¹ and Hal² are as defined above, and coupling the product onto an amine of the general formula IV

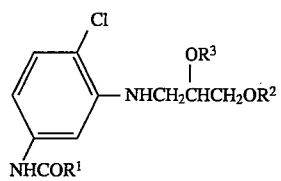

(IV)

in which $R^1$, $R^2$ and $R^3$ are as defined above.

The compounds of the general formulae III and IV are known and can be prepared by methods known to one skilled in the art.

The dyes of the general formula I according to the invention or the mixtures according to the invention are formulated before dyeing, i.e. they are milled in the presence of water and dispersants in suitable mills, such as, for example, ball or sand mills, and, if a pulverulent dye formulation is to be prepared, then spray-dried.

Examples of suitable dispersants are anionic or non-ionic dispersants, which can also be used together.

Examples of anionic dispersants are condensation products of aromatic sulphonic acids with formaldehyde, in particular condensation products of alkylnaphthalenesulphonic acids with formaldehyde, condensation products of substituted or unsubstituted phenol with formaldehyde and sodium bisulphite, alkali metal salts of condensation products of substituted or unsubstituted phenol, naphthalene- or naphtholsulphonic acids with formaldehyde and sodium bisulphite, alkali metal salts of condensation products of substituted or unsubstituted phenolsulphonic acids with formaldehyde and urea and alkali metal salts of lignosulphonic acids; alkyl- or alkylarylsulphonates, and alkylarylpolyglycol ether sulphates.

Examples of non-ionic dispersants or emulsifiers are reaction products of alkylene oxides, such as, for example, ethylene oxide or propylene oxide with alkylatable compounds, such as, for example, fatty alcohols, fatty amines, fatty acids, phenols, alkylphenols, arylalkylphenols, arylalkylarylphenols and carboxamides, such as, for example, adducts of 5 to 10 ethylene oxide units with $(C_8\text{–}C_{10})$-alkylphenols.

Milling is carried out at a temperature of between 10° and 90° C., preferably at 30° to 60° C. When separately prepared individual components are formulated together, joint milling at temperatures of more than 30° C. is advantageous. This comminutes the dye particles mechanically in such a manner that an optimum specific surface area is achieved and sedimentation of the dye is kept to a minimum. The particle sizes of the dyes are in general between 0.5 and 5 μ, preferably about 1 μ.

The dye mixtures according to the invention can be prepared by various processes, for example by mixing the separately prepared individual dyes, it being preferred to mix already formulated individual dyes. This mixing process is carried out in suitable mixers, such as, for example, tumbling mixers or stirrers. However, separately formulated individual dyes can also be mixed by stirring them into dye liquors.

Furthermore, dye mixtures according to the invention can preferably be prepared by joint formulation of the separately prepared mixing components, i.e. by joint milling and/or spray-drying.

Furthermore, dye mixtures according to the invention can preferably be prepared by mixing the dye precursors of the general formula II and subsequent joint cyano exchange, as described above.

The composition of the mixtures of dye precursors of the general formula II is selected such that mixtures according to the invention are formed. This process is, as described above, followed by formulation.

If it is desired to formulate separately prepared dyes of the general formula I together, it is advantageous to carry out a joint thermal treatment beforehand. This treatment is characterised in that the individual dyes of the general formula I are heated together, if desired under pressure in water at temperatures of 50° to 150° C., preferably 90° to 130° C., for half an hour to several hours, and cooled such down. This heating is advantageously carried out in the presence of one or more dispersants or an organic solvent. Examples of such solvents are methanol, ethanol, dimethylformamide or dimethyl sulphoxide, but preferably solvents which have a low solubility in water, such as toluene, chlorobenzene, 1,2-dichlorobenzene or butyl acetate. These solvents can again be distilled off after the thermal treatment. However, they can also be separated off by filtration, followed by washing of the mixture with water. This preparation process can then be followed by formulation of the mixture.

Particularly preferably, the separately prepared dyes according to the invention of the general formula I are treated before formulation by joint dissolution in an organic solvent, solvent mixture or a mineral acid, followed by crystallisation and/or precipitation, isolation, for example by filtration and removal of solvent residues, for example by washing. In this case too, this treatment can be followed by formulation of the mixture.

Preferred organic solvents are polar protic solvents, such as dimethylformamide, dimethyl sulphoxide or N-methylpyrrolidone. It is advantageous to dissolve the mixing components completely. In the case of more sparingly soluble mixing components, this can be achieved by increasing the amount of solvent, the dissolution temperature or the dissolution time. In order to save solvents, dissolution is advantageously carried out at elevated temperature, using temperatures of up to the boiling temperature of the particular solvent. If desired, the temperature can also be raised beyond that under pressure.

The dyes and dye mixtures according to the invention are highly suitable for the dyeing and printing of hydrophobic synthetic materials individually or in a mixture with other disperse dyes. Examples of suitable hydrophobic synthetic materials are: secondary cellulose acetate, cellulose triacetate, polyamides and high-molecular-weight polyester. Preferably, the dyes according to the invention are used for the dyeing and printing of materials made of high-molecular-weight polyesters, in particular those based on polyethylene glycol terephthalates or blends thereof with natural fibre materials, or of cellulose triacetate materials.

The hydrophobic synthetic materials can be present in the form of sheet-like or filament-like structures and be processed, for example, to yarns or woven or knitted textile materials. Dyeing of the fibre material mentioned using the dyes or dye mixtures according to the invention can take place in a manner known per se, preferably from an aqueous suspension, if appropriate in the presence of carriers, between 80° and about 110° C., by the exhaust method or by the HT process in a dyeing autoclave at 110° to 140° C., and by the so-called thermofix method, in which the material is padded with the dye liquor and then fixed at about 80° to 230° C. Printing of the materials mentioned can be carried out in a manner known per se by incorporating the dyes or dye mixtures according to the invention in a printing paste and treating the material printed therewith, if appropriate in the presence of a carrier, at temperatures of between 80° and 230° C. with HT steam, pressurised steam or dry heat, in order to fix the dyes. In this manner, brilliant bluish-red dyeings of very high colour strength and very good general use fastness properties, such as fastness to dry heat setting, wash, water and thermomigration fastness and in particular very good light fastness, are obtained.

The dyes and dye mixtures according to the invention are suitable very particularly for the dyeing and printing of polyester fibres and polyester textile materials for automotive cover fabrics. For this purpose, the dyes described above of the general formula I or mixtures thereof with one or more dyes, such as are usually used for the dyeing of automotive cover fabrics, are preferably used. Moreover, it is preferred to carry out the dyeing of automotive cover fabrics in the presence of UV absorbers. Examples of suitable UV absorbers are those based on benzophenone and benzotriazole.

Details regarding the dyeing of automotive cover fabrics are described, for example, in Textilveredelung 20 (1985), No. 4, pages 126, 20 (1985), No. 11, page 356 and 23 (1988), No. 5, page 170.

The dyes or dye mixtures according to the invention are also suitable for the dyeing of the above-recited hydrophobic materials from organic solvents by the methods known for this. In the dye liquors and printing pastes used in the above applications, the dyes or dye mixtures according to the invention should be present in a very finely divided form.

Fine dispersion of the dyes is carried out in a manner known per se by suspending the as-synthesised dye together with dispersants in a liquid medium, preferably in water, and subjecting the mixture to the action of shearing forces, the originally present dye particles being mechanically comminuted to such an extent that an optimum specific surface area is achieved and sedimentation of the dye is kept to a minimum. The particle sizes of the dyes are in general between 0.5 and 5 µm, preferably about 1 µm.

The dispersants used in the milling process can be non-ionic or anionic. Examples of non-ionic dispersants are reaction products of alkylene oxides, such as, for example, ethylene oxide or propylene oxide with alkylatable compounds, such as, for example, fatty alcohols, fatty amines, fatty acids, phenols, alkylphenols and carboxamides. Examples of anionic dispersants are lignosulphonates, alkyl- or alkylarylsulphonates or alkylarylpolyglycol ether sulphates.

The dye preparations thus obtained should be pourable for most applications. Accordingly, the dye and dispersant content is limited in these cases. In general, the dispersions are set to a dye content of up to 50 per cent by weight and a dispersant content of up to about 25%. For economical reasons, the dye contents in most cases do not drop below 15 per cent by weight.

The dispersions can also contain further auxiliaries, for example those acting as oxidising agents, such as, for example, sodium m-nitrobenzenesulphonate or fungicides, such as, for example, sodium o-phenylphenolate and sodium pentachlorophenolate and in particular so-called "acid donors", such as, for example, butyrolactone, monochloroacetamide, sodium chloroacetate, sodium dichloroacetate, sodium 3-chloropropionate, monoesters of sulphuric acid, such as, for example, lauryl sulphate, sulphuric esters of ethoxylated and propoxylated alcohols, such as, for example, butylglycol sulphate.

The dye dispersions thus obtained can be used very advantageously for the preparation of printing pastes and dye liquors. They are of particular advantage, for example, in continuous processes, in which the dye concentration of the dye liquors has to be kept constant by continuous metering of dye into the running apparatus.

For certain areas of application, powder formulations are preferred. These powders contain the dye or dye mixture, dispersant and other auxiliaries, such as, for example, wetting and oxidising agents, preservatives and dustproofing agents and the abovementioned "acid donors".

A preferred preparation process for pulverulent dye preparations consists in removing the liquid from the liquid dye dispersions described above, for example by vacuum-drying, freeze-drying, drying on drum driers, but preferably by spray-drying.

To prepare the dye liquors, the required amounts of dye formulations prepared according to the above details are diluted with the dyeing medium, preferably with water, to such an extent that a liquor ratio of 5:1 to 50:1 is obtained for dyeing. Additionally, further dyeing assistants, such as dispersants, wetting agents and fixation auxiliaries are in general added to the liquors. The pH is set to a value of 4 to 5, preferably 4.5, by addition of organic and inorganic acids, such as acetic acid, succinic acid, boric acid or phosphoric acid. It is advantageous to buffer the pH obtained and to add a sufficient amount of a buffer system. An example of an advantageous buffer system is the system acetic acid/sodium acetate.

If it is desired to use the dye or the dye mixture for textile printing, the required amounts of dye formulations are kneaded in a manner known per se together with thickeners, such as, for example, alkali metal alginates or the like, and, if desired, further additives, such as, for example, fixation accelerators, wetting agents and oxidising agents, to give printing pastes.

The dyes and dye mixtures according to the invention surprisingly offer clear advantages compared with the similar dyes of EP 43,795, in particular with respect to build-up and exhaust properties. Higher colour depths can be obtained with them and they are more economical, since they effect more complete exhaustion onto the material to be dyed and cause less pollution of the waste water. Their temperature sensitivity is lower, i.e. the variations in colour depth upon variation of the dyeing temperature are smaller. They even dye when the dyeing time is shortened and are absorbed by substrates, such as, for example, modified polyester, polyamide, cellulose triacetate and secondary cellulose acetate. A further advantage is that they are suitable as an alternative to C.I. Disperse Red 60 owing to their high colour depth and their particularly clear shade and have substantial advantages over that dye in terms of cost. As a result of their excellent lightfastness even at elevated temperature and humidity, they are furthermore highly suitable for the dyeing of automotive cover fabrics, if appropriate in mixtures as described above.

Overall, the dyes and dye mixtures according to the invention thus provide an unforeseeable substantial advantage in practical application compared with the prior art.

The invention is illustrated in more detail by the examples which follow. The percentages given are per cent by weight.

EXAMPLE 1

62.5 g of the dye precursor of the formula IIa

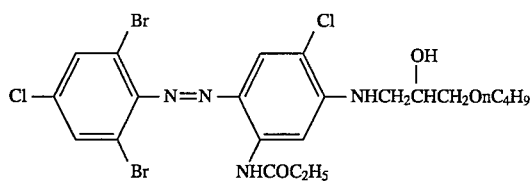
(IIa)

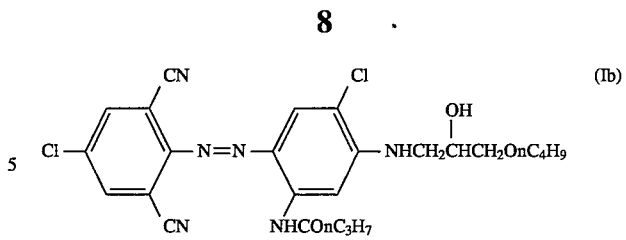
(Ib)

are introduced into a suspension of 100 ml of dimethyl sulphoxide, 2.1 g of sodium cyanide and 7.1 g of copper(I) cyanide at 70° to 75° C., and the mixture is stirred at this temperature for 30 minutes. The temperature is then raised to 110° C. for 30 minutes, and the batch is then slowly stirred until it has cooled down, the product is filtered off with suction, washed with 45 ml of dimethyl sulphoxide, 7.5% aqueous ammonia solution and water and dried under reduced pressure. In this manner, 38.2 g of the dye of the formula Ia and of the formula Ic

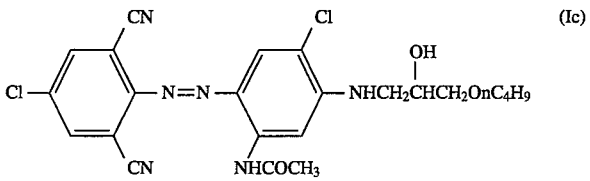
(Ic)

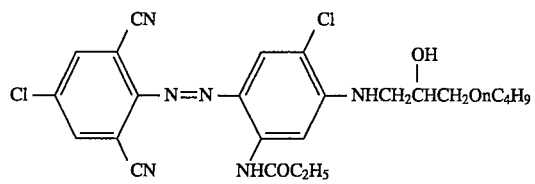

which likewise dissolves in o-dichlorobenzene, giving a red colour.

1.3 g of a commercially available powder preparation of C.I. Disperse Yellow 42, 1 g of a commercially available powder preparation of C.I. Disperse Blue 27 and 0.1 g of the dye mixture described above are stirred into 2000 g of water. 4 g of sodium acetate are added to the dispersion, the mixture is brought to a pH of 5 with acetic acid, and 4 g of a commercially available levelling agent based on a linear anionic polycondensation product and 3 g of a commercially available UV absorber based on benzotriazole are added. The dye liquor thus obtained is entered with 100 g of an automotive cover fabric based on polyethylene glycol terephthalate, and the fabric is dyed at 130° C. for one hour. After subsequent rinsing, reductive after-treatment, rinsing and drying, a brown dyeing having excellent lightfastness is obtained.

are obtained, which has its absorption maximum at 528 nm and dissolves in o-dichlorobenzene, giving a red colour.

0.6 g of the dye thus obtained is stirred into 2000 g of water in finely dispersed form. The dispersion is brought to a pH of 4.5 with acetic acid and sodium acetate, and 2.0 g of a commercially available dispersant based on a naphthalenesulphonic acid/formaldehyde condensation product are added.

The dye liquor thus obtained is entered with 100 g of a polyester fabric based on polyethylene glycol terephthalate, and the fabric is dyed at 130° C. for 45 minutes.

After subsequent rinsing, reductive after-treatment with a 0.2% sodium dithionite solution at 70° to 80° C. for 15 minutes, rinsing and drying, a red dyeing of high colour strength and very good coloristic properties, in particular very good light fastness and fastness to dry heat setting, is obtained.

EXAMPLE 3

15 g of the dye of the formula Ic are incorporated in finely divided form in a printing paste containing 45 g of carob seed flour, 6 g of sodium 3-nitrobenzenesulphonate and 3 g of citric acid per 100 g. If polyester is printed using this printing paste, the printed fabric is steamed after drying at 1.5 atmospheres gauge for 15 minutes, soaped, rinsed and dried to give, a bluish red print of high colour strength and excellent fastness properties.

In Table I below, further dyes according to the invention and in Table II below dye mixtures according to the invention are listed, which likewise produce red dyeings and prints on polyester and likewise have very good coloristic properties.

EXAMPLE 2

The procedure as described in Example 1 is repeated, except that the 62.5 g of the dye precursor of the formula IIa is replaced by a mixture of 30.1 g of the dye precursor of the formula IIb

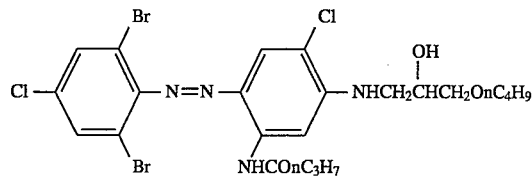
(IIb)

The hues on polyester are defined as follows:
1=bluish red
2=red
3=bright red and 29 g of the dye precursor of the formula IIc

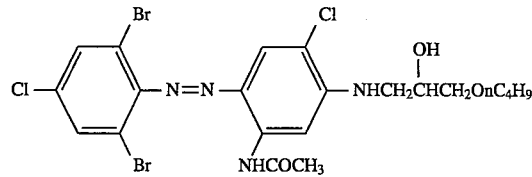
(IIc)

giving 44 g of a mixture of the dyes of the formula Ib

TABLE I

| X | R¹ | R² | R³ | Hue on polyester |
|---|----|----|----|------------------|
| Cl | iC₃H₇ | nC₄H₉ | H | 1 |

TABLE I-continued

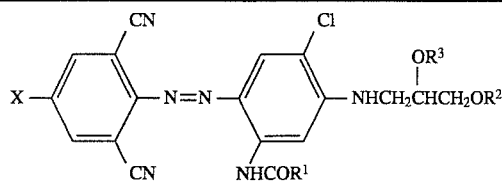

| X | R¹ | R² | R³ | Hue on polyester |
|---|---|---|---|---|
| Cl | $nC_4H_9$ | $nC_4H_9$ | H | 1 |
| Br | $C_2H_5$ | $nC_4H_9$ | H | 1 |
| Br | $nC_3H_7$ | $nC_4H_9$ | H | 1 |
| Br | $nC_4H_9$ | $nC_4H_9$ | H | 1 |
| Br | $iC_4H_9$ | $nC_4H_9$ | H | 1 |
| $CH_3$ | $C_2H_5$ | $nC_4H_9$ | H | 3 |
| $CH_3$ | $nC_3H_7$ | $nC_4H_9$ | H | 3 |
| $CH_3$ | $iC_3H_7$ | $nC_4H_9$ | H | 3 |
| Cl | $C_2H_5$ | $COCH_3$ | H | 1 |
| Cl | $nC_3H_7$ | $CH_3$ | H | 1 |
| Cl | $nC_4H_9$ | $CH_3$ | H | 1 |
| Br | $nC_3H_7$ | $CH_3$ | H | 1 |
| Br | $iC_3H_7$ | $CH_3$ | H | 1 |
| $CH_3$ | $C_2H_5$ | $CH_3$ | H | 3 |
| Cl | $C_2H_5$ | $C_2H_5$ | H | 1 |
| Cl | $nC_3H_7$ | $C_2H_5$ | H | 1 |
| Cl | $iC_3H_7$ | $C_2H_5$ | H | 1 |
| Br | $nC_3H_7$ | $C_2H_5$ | H | 1 |
| Br | $nC_4H_9$ | $C_2H_5$ | H | 1 |
| $CH_3$ | $C_2H_5$ | $COC_2H_5$ | H | 3 |
| Cl | $nC_3H_7$ | $nC_3H_7$ | H | 1 |
| Cl | $C_2H_5$ | $nC_3H_7$ | H | 1 |
| Br | $C_2H_5$ | $nC_3H_7$ | H | 1 |
| Br | $nC_4H_9$ | $nC_3H_7$ | H | 1 |
| Cl | $iC_3H_7$ | $iC_3H_7$ | H | 1 |
| Br | $C_2H_5$ | $iC_3H_7$ | H | 1 |
| Cl | $C_2H_5$ | $i-C_4H_9$ | H | 1 |
| Cl | $nC_3H_7$ | $i-C_4H_9$ | H | 1 |
| Br | $C_2H_5$ | $i-C_4H_9$ | H | 1 |
| $CH_3$ | $iC_4H_9$ | $i-C_4H_9$ | H | 3 |
| Cl | $C_2H_5$ | $sek.C_4H_9$ | H | 1 |
| Cl | $iC_3H_7$ | $sek.C_4H_9$ | H | 1 |
| Br | $nC_4H_9$ | $sek.C_4H_9$ | H | 1 |
| Cl | $nC_3H_7$ | $nC_5H_{11}$ | H | 1 |
| Br | $C_2H_5$ | $nC_5H_{11}$ | H | 1 |
| Cl | $C_2H_5$ | $nC_6H_{13}$ | H | 1 |
| Br | $C_2H_5$ | $nC_6H_{13}$ | H | 1 |
| Cl | $C_2H_5$ | $CH_2CH=CH_2$ | H | 1 |
| Cl | $nC_3H_7$ | $CH_2CH=CH_2$ | H | 1 |
| Cl | $nC_4H_9$ | $CH_2CH=CH_2$ | H | 1 |
| Br | $iC_3H_7$ | $CH_2CH=CH_2$ | H | 1 |
| Br | $C_2H_5$ | $CH_2CH=CH_2$ | H | 1 |
| Br | $iC_4H_9$ | $CH_2CH=CH_2$ | H | 1 |
| $CH_3$ | $C_2H_5$ | $CH_2CH=CH_2$ | H | 3 |
| Cl | $nC_3H_7$ | $(CH_2)_2OCH_3$ | H | 1 |
| Cl | $iC_3H_7$ | $(CH_2)_2OCH_3$ | H | 1 |
| Cl | $nC_4H_9$ | $(CH_2)_2OCH_3$ | H | 1 |
| Br | $C_2H_5$ | $(CH_2)_2OCH_3$ | H | 1 |
| Br | $iC_4H_9$ | $(CH_2)_2OCH_3$ | H | 1 |
| $CH_3$ | $nC_3H_7$ | $(CH_2)_2OCH_3$ | H | 3 |
| Cl | $C_2H_5$ | $(CH_2)_2OC_2H_5$ | H | 1 |
| Cl | $nC_3H_7$ | $(CH_2)_2OC_2H_5$ | H | 1 |
| Br | $nC_3H_7$ | $(CH_2)_2OC_2H_5$ | H | 1 |
| Br | $iC_3H_7$ | $(CH_2)_2OnC_3H_7$ | H | 1 |
| Br | $C_2H_5$ | $(CH_2)_2OiC_3H_7$ | H | 1 |
| Cl | $C_2H_5$ | $(CH_2)_2OnC_4H_9$ | H | 1 |
| $CH_3$ | $C_2H_5$ | $(CH_2)_2OnC_4H_9$ | H | 3 |
| Cl | $C_2H_5$ | $(CH_2)_2OiC_4H_9$ | H | 1 |
| Br | $C_2H_5$ | $(CH_2)_2OsekC_4H_9$ | H | 1 |
| Cl | $iC_3H_7$ | $(CH_2)_3OCH_3$ | H | 1 |
| Cl | $C_2H_5$ | $(CH_2)_4OCH_3$ | H | 1 |
| Cl | $C_2H_5$ | $(CH_2)_4OCH_3$ | H | 1 |
| Br | $C_2H_5$ | $(CH_2)_4OCH_3$ | H | 1 |
| Cl | $C_2H_5$ | $(CH_2)_4OC_2H_5$ | H | 1 |
| Br | $C_2H_5$ | $(CH_2)_4OnC_4H_9$ | H | 1 |
| Cl | $C_2H_5$ | $COCH_3$ | H | 2 |
| Cl | $nC_3H_7$ | $COCH_3$ | H | 2 |

TABLE I-continued

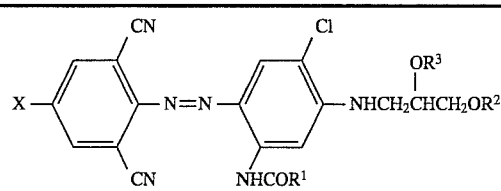

| X | R¹ | R² | R³ | Hue on polyester |
|---|---|---|---|---|
| Cl | $nC_4H_9$ | $COCH_3$ | H | 2 |
| Br | $C_2H_5$ | $COCH_3$ | H | 2 |
| Br | $iC_3H_7$ | $COCH_3$ | H | 2 |
| $CH_3$ | $iC_4H_9$ | $COCH_3$ | H | 3 |
| Cl | $C_2H_5$ | $COC_2H_5$ | H | 2 |
| Cl | $iC_3H_7$ | $COC_2H_5$ | H | 2 |
| Br | $nC_3H_7$ | $COC_2H_5$ | H | 2 |
| Cl | $C_2H_5$ | $C_6H_5$ | H | 1 |
| Cl | $nC_3H_7$ | $C_6H_5$ | H | 1 |
| Br | $nC_3H_7$ | $C_6H_5$ | H | 1 |
| Cl | $C_2H_5$ | $C_2H_5$ | $COCH_3$ | 1–2 |
| Cl | $nC_3H_7$ | $C_2H_5$ | $COCH_3$ | 1–2 |
| Cl | $C_2H_5$ | $nC_4H_9$ | $COCH_3$ | 1–2 |
| Cl | $nC_3H_7$ | $nC_4H_9$ | $COCH_3$ | 1–2 |
| Cl | $iC_3H_7$ | $CH_2CH=CH_2$ | $COCH_3$ | 1–2 |
| Cl | $C_2H_5$ | $(CH_2)_2OCH_3$ | $COCH_3$ | 1–2 |
| Cl | $nC_3H_7$ | $(CH_2)_2OC_2H_5$ | $COCH_3$ | 1–2 |
| Cl | $C_2H_5$ | $C_6H_5$ | $COCH_3$ | 2 |
| Br | $C_2H_5$ | $COCH_3$ | $COCH_3$ | 2–3 |
| Br | $nC_3H_7$ | $C_2H_5$ | $COCH_3$ | 2 |
| Br | $nC_3H_7$ | $nC_4H_9$ | $COCH_3$ | 2 |
| Br | $C_2H_5$ | $nC_4H_9$ | $COCH_3$ | 2 |
| Br | $C_2H_5$ | $(CH_2)_2OCH_3$ | $COCH_3$ | 2 |
| Br | $nC_3H_7$ | $(CH_2)_2OCH_3$ | $COCH_3$ | 2 |
| $CH_3$ | $C_2H_5$ | $nC_4H_9$ | $COCH_3$ | 3 |
| $CH_3$ | $C_2H_5$ | $(CH_2)_2OCH_3$ | $COCH_3$ | 3 |
| Cl | $C_2H_5$ | $COC_2H_5$ | $COC_2H_5$ | 2–3 |
| Cl | $nC_3H_7$ | $CH_3$ | $COC_2H_5$ | 2 |
| Cl | $C_2H_5$ | $nC_4H_9$ | $COC_2H_5$ | 2 |
| Cl | $C_2H_5$ | $(CH_2)_2OCH_3$ | $COC_2H_5$ | 2 |
| Br | $C_2H_5$ | $nC_4H_9$ | $COC_2H_5$ | 2 |
| Br | $nC_3H_7$ | $CH_2CH=CH_2$ | $COC_2H_5$ | 2 |
| Br | $C_2H_5$ | $(CH_2)_2OCH_3$ | $COC_2H_5$ | 2 |
| $CH_3$ | $iC_3H_7$ | $nC_4H_9$ | $COC_2H_5$ | 3 |
| $CH_3$ | $nC_3H_7$ | $(CH_2)_2OCH_3$ | $COC_2H_5$ | 3 |

TABLE II

| X | R¹ | R² | R³ | Mixing ratio | Hue on polyester |
|---|---|---|---|---|---|
| Cl | $CH_3$ | $nC_4H_9$ | H | 50 | 1 |
| Cl | $C_2H_5$ | $nC_4H_9$ | H | 50 | |
| Cl | $CH_3$ | $nC_4H_9$ | H | 60 | 1 |
| Cl | $iC_3H_7$ | $nC_4H_9$ | H | 40 | |
| Cl | $CH_3$ | $COC_2H_5$ | H | 10 | 1 |
| Cl | $nC_3H_7$ | $C_2H_5$ | H | 90 | |
| Cl | $CH_3$ | $CH_2CH=CH_2$ | H | 35 | 1 |
| Cl | $C_2H_5$ | $CH_2CH=CH_2$ | H | 65 | |
| Cl | $CH_3$ | $(CH_2)_2OCH_3$ | H | 20 | 1 |
| Cl | $nC_3H_7$ | $(CH_2)_2OCH_3$ | H | 80 | |
| Cl | $C_2H_5$ | $(CH_2)_2OC_2H_5$ | H | 5 | 1 |
| Cl | $nC_3H_7$ | $(CH_2)_2OC_2H_5$ | H | 95 | |
| Cl | $C_2H_5$ | $nC_4H_9$ | H | 45 | 1 |
| Cl | $nC_3H_7$ | $nC_3H_7$ | H | 55 | 1 |
| Cl | $C_2H_5$ | $nC_4H_9$ | H | 30 | 1–2 |
| Cl | $C_2H_5$ | $nC_4H_9$ | $COCH_3$ | 70 | |
| Cl | $nC_3H_7$ | $C_2H_5$ | H | 50 | 1 |
| Cl | $nC_3H_7$ | $nC_4H_9$ | H | 50 | |
| Cl | $C_2H_5$ | $(CH_2)_2OCH_3$ | H | 50 | 2 |
| Cl | $C_2H_5$ | $(CH_2)_2OC_2H_5$ | $COC_2H_5$ | 50 | |
| Cl | $C_2H_5$ | $nC_4H_9$ | $COCH_3$ | 95 | 1–2 |
| Cl | $iC_3H_7$ | $nC_4H_9$ | H | 5 | |
| Br | $CH_3$ | $CH_3$ | H | 15 | 1 |
| Br | $nC_3H_7$ | $CH_3$ | H | 85 | |

TABLE II-continued

| X | R¹ | R² | R³ | Mixing ratio | Hue on polyester |
|---|---|---|---|---|---|
| Br | CH₃ | nC₄H₉ | H | 80 | 1 |
| Br | C₂H₅ | nC₄H₉ | H | 20 | |
| Br | CH₃ | (CH₂)₂OCH₃ | H | 67 | 1 |
| Br | iC₃H₇ | (CH₂)₂OCH₃ | H | 33 | |
| Br | CH₃ | nC₄H₉ | H | 98 | 1 |
| Br | nC₄H₉ | COC₂H₅ | H | 2 | |
| Br | nC₃H₇ | nC₃H₇ | H | 60 | 1-2 |
| Br | nC₃H₇ | nC₃H₇ | COC₂H₅ | 40 | |
| Br | iC₃H₇ | COC₂H₅ | H | 70 | 1-2 |
| Br | iC₃H₇ | NC₄H₉ | H | 30 | |
| Br | C₂H₅ | CH₂CH=CH₂ | H | 90 | 1 |
| Br | C₂H₅ | (CH₂)₂OC₂H₅ | COCH₃ | 10 | |
| Br | C₂H₅ | (CH₂)₂OC₂H₅ | H | 30 | 1-2 |
| Br | nC₃H₇ | (CH₂)₂OC₂H₅ | COCH₃ | 70 | |
| CH₃ | CH₃ | (CH₂)₂OCH₃ | H | 40 | 3 |
| CH₃ | iC₄H₉ | (CH₂)₂OCH₃ | H | 60 | |
| CH₃ | CH₃ | nC₃H₇ | H | 90 | 3 |
| CH₃ | nC₃H₇ | nC₃H₇ | H | 10 | |
| CH₃ | C₂H₅ | nC₄H₉ | H | 30 | 3 |
| CH₃ | C₂H₅ | nC₄H₉ | COCH₃ | 70 | |
| CH₃ | C₂H₅ | (CH₂)₂OCH₃ | H | 60 | 3 |
| CH₃ | iC₃H₇ | (CH₂)₄OCH₃ | H | 40 | |
| Cl | CH₃ | C₂H₅ | H | 50 | 1 |
| Cl | CH₃ | nC₄H₉ | H | 50 | |
| Cl | CH₃ | (CH₂)₂OCH₃ | H | 70 | 1 |
| Cl | CH₃ | (CH₂)₂OC₂H₅ | H | 30 | |
| Cl | CH₃ | nC₄H₉ | H | 30 | 2 |
| Cl | CH₃ | COCH₃ | COCH₃ | 70 | |
| Br | CH₃ | nC₃H₇ | H | 55 | 1 |
| Br | CH₃ | nC₅H₁₁ | H | 45 | |
| Br | CH₃ | (CH₂)₂OnC₄H₉ | COCH₃ | 80 | 2 |
| Br | CH₃ | (CH₂)₂OnC₄H₉ | COC₂H₅ | 20 | |
| CH₃ | CH₃ | (CH₂)₂OCH₃ | H | 40 | 3 |
| CH₃ | CH₃ | (CH₂)₄OC₂H₅ | H | 60 | |
| Cl | CH₃ | C₂H₅ | H | 15 | 1 |
| Br | CH₃ | C₂H₅ | H | 85 | |
| Cl | CH₃ | iC₃H₇ | H | 85 | 1-2 |
| Br | CH₃ | iC₃H₇ | COC₂H₅ | 15 | |
| Cl | C₂H₅ | nC₄H₉ | H | 95 | 1 |
| Br | C₂H₅ | nC₄H₉ | H | 5 | |
| Cl | nC₃H₇ | nC₃H₇ | H | 20 | 1 |
| Br | nC₃H₇ | CH₂CH=CH₂ | H | 80 | |
| Cl | CH₃ | CH₂CH=CH₂ | H | 50 | 1 |
| Br | CH₃ | CH₂CH=CH₂ | H | 50 | |
| Cl | CH₃ | C₂H₅ | COCH₃ | 15 | 1-2 |
| Br | nC₃H₇ | C₂H₅ | H | 85 | |
| Cl | nC₃H₇ | (CH₂)₂OC₂H₅ | H | 55 | 1 |
| Br | nC₃H₇ | (CH₂)₂OC₂H₅ | H | 45 | |
| Cl | C₂H₅ | nC₃H₇ | COCH₃ | 45 | 1-2 |
| Br | C₂H₅ | nC₃H₇ | COCH₃ | 55 | |
| Cl | C₂H₅ | nC₄H₉ | H | 3 | |
| CH₃ | C₂H₅ | nC₄H₉ | H | 97 | 3 |
| Br | iC₃H₇ | CH₃ | COCH₃ | 50 | 2-3 |
| CH₃ | iC₃H₇ | COCH₃ | COCH₃ | 50 | |
| Cl | CH₃ | CH₂CH=CH₂ | H | 33⅓ | 1 |
| Cl | C₂H₅ | CH₂CH=CH₂ | H | 33⅓ | |
| Cl | nC₃H₇ | CH₂CH=CH₂ | H | 33⅓ | |
| Cl | C₂H₅ | C₂H₅ | H | 30 | 2 |
| Cl | C₂H₅ | C₂H₅ | COCH₃ | 60 | |
| Cl | CH₃ | COC₂H₅ | COCH₃ | 10 | |
| Br | C₂H₅ | nC₃H₉ | H | 25 | 1 |
| Br | nC₃H₇ | nC₄H₉ | H | 25 | |
| Br | nC₃H₇ | C₂H₅ | H | 50 | |
| Cl | CH₃ | nC₆H₁₃ | H | 40 | 1 |
| Cl | CH₃ | nC₃H₇ | H | 30 | |
| Br | C₂H₅ | nC₆H₁₃ | H | 30 | |
| Cl | CH₃ | iC₄H₉ | H | 45 | 1 |
| Br | CH₃ | iC₄H₉ | H | 45 | |
| Br | CH₃ | COCH₃ | H | 10 | |
| Cl | CH₃ | nC₄H₉ | H | 25 | 1 |
| Cl | nC₃H₇ | nC₄H₉ | H | 25 | |
| Br | CH₃ | nC₃H₉ | H | 25 | |
| Br | nC₃H₇ | nC₄H₉ | H | 25 | |

I claim:

1. A monoazo dye of the general formula I

in which

X is methyl, chlorine or bromine,

R¹ is ethyl, n-propyl, i-propyl, n-butyl or i-butyl,

R² is ($C_1$–$C_6$)-alkyl, ($C_1$–$C_4$)-alkoxy-substituted linear ($C_2$–$C_4$)-alkyl or allyl and R³ is hydrogen, acetyl or propionyl.

2. A monoazo dye according to claim 1, wherein

X is bromine or chlorine,

R¹ is ethyl, n-propyl or i-propyl,

R² is ($C_1$–$C_4$)-alkyl, 2-methoxyethyl, 2-ethyoxyethyl or allyl and

R³ is hydrogen.

3. A mixture of at least two monoazo dyes of the general formula I

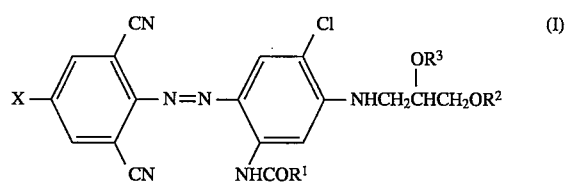

in which

X is methyl, chlorine or bromine,

R¹ is ethyl, n-propyl, i-propyl, n-butyl or i-butyl,

R² is ($C_1$–$C_6$)-alkyl, ($C_1$–$C_4$)-alkoxy-substituted linear ($C_2$–$C_4$)-alkyl or allyl and R³ is hydrogen, acetyl or propionyl.

4. A mixture according to claim 3, wherein X, R² and R³ are the same and the monoazo dyes only differ in the meaning of R¹.

5. A mixture of monoazo dyes comprising the dye as claimed in claim 1, shaded with a different dye.

6. A mixture of monoazo dyes comprising the dye as claimed in claim 2, shaded with a different dye.

7. A mixture of monoazo dyes comprising the dyes as claimed in claim 3, shaded with a different dye.

8. A mixture of monoazo dyes comprising the dyes as claimed in claim 4, shaded with a different dye.

9. The mixture according to claim 5, wherein said different dye is C.I. Solvent Orange 63.

10. The mixture according to claim 6, wherein said different dye is C.I. Solvent Orange 63.

11. The mixture according to claim 7, wherein said different dye is C.I. Solvent Orange 63.

12. The mixture according to claim 8, wherein said different dye is C.I. Solvent Orange 63.

13. A process for dyeing polyester fibres or polyester textile materials comprising applying thereto one or more dyes in claim 1 with one or more different dyes.

14. The process as claimed in claim 13, wherein the different dyes are selected from the group consisting of azo, disazo, anthraquinone, nitro, naphthalimide and terephthalimide dyes.

15. A process for dyeing and printing of hydrophobic synthetic materials comprising applying thereto the dyes as claimed in claim 1.

16. The process as claimed in claim 15, wherein the hydrophobic synthetic material is used for automobile cover fabric.

17. A process for dyeing and printing of hydrophobic synthetic materials comprising applying thereto the mixture of dyes as claimed in claim 3.

18. The process as claimed in claim 17, wherein the hydrophobic synthetic material is used for automobile cover fabric.

* * * * *